United States Patent [19]
Yamaguchi et al.

[11] 3,887,271
[45] June 3, 1975

[54] OPTICAL ELEMENT HAVING THEREIN PHOTOCHROMIC AND FLUORESCENCE-QUENCHING PATTERNS AND A METHOD FOR MANUFACTURING SAME

[75] Inventors: Kazunori Yamaguchi; Takeo Itimura; Teruo Kaneko, all of Tokyo; Hiroshi Yamamoto, Kawasaki, all of Japan

[73] Assignee: Nippon Kogaku K.K., Tokyo, Japan

[22] Filed: June 19, 1974

[21] Appl. No.: 480,943

[30] Foreign Application Priority Data
June 25, 1973  Japan.............................. 48-70762

[52] U.S. Cl. ................ 250/458; 250/337; 250/483; 250/484; 350/160 P
[51] Int. Cl. .............................................. G01t 1/11
[58] Field of Search................ 340/173 SS, 173 LT; 350/160 P; 250/458, 483, 487, 484, 488, 337

[56] References Cited
UNITED STATES PATENTS

| | | | |
|---|---|---|---|
| 2,515,940 | 7/1950 | Stookey | 350/160 |
| 3,244,979 | 4/1966 | Hershinger | 250/458 |
| 3,374,381 | 3/1968 | Albinak | 250/458 |
| 3,440,621 | 4/1969 | Knapp | 350/160 P |

*Primary Examiner*—Harold A. Dixon
*Attorney, Agent, or Firm*—Fitzpatrick, Cella, Harper & Scinto

[57] ABSTRACT

An optical element and a method for manufacturing same containing therein a pattern or patterns having both photochromic and fluorescence-quenching properties, wherein ions having such properties are penetrated in a desired pattern into a fluorescent glass base containing therein ion-exchangeable ions to cause ion-exchanging between the penetrated ions and the existing ions in the glass base, thereby forming, at the interior of the glass base, mechanically and chemically stable patterns.

12 Claims, 10 Drawing Figures

FIG. 1(a) FIG. 1(b)
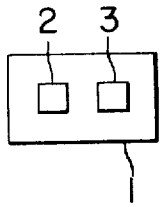 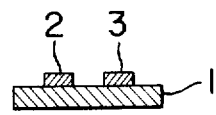
FIG. 2(a) FIG. 2(b)
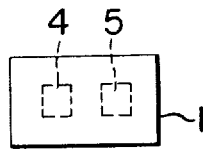 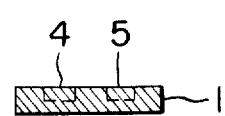
FIG. 3(a) FIG. 3(b)
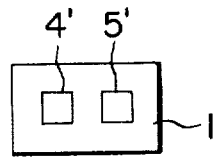 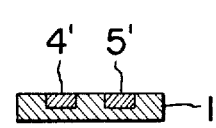
FIG. 4(a) FIG. 4(b)
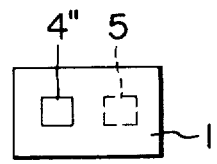 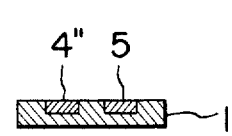
FIG. 5
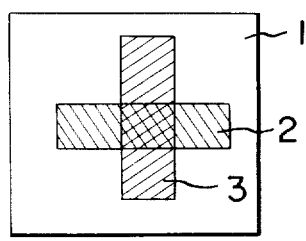
FIG. 6
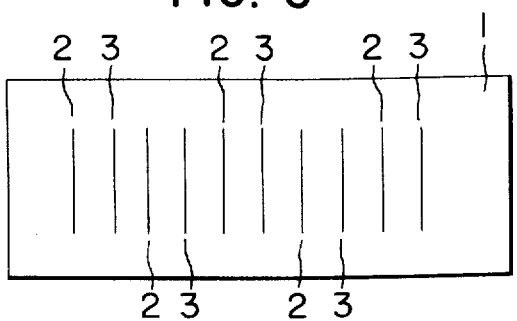

3,887,271

OPTICAL ELEMENT HAVING THEREIN PHOTOCHROMIC AND FLUORESCENCE-QUENCHING PATTERNS AND A METHOD FOR MANUFACTURING SAME

BACKGROUND OF THE INVENTION

1. Field of the Invention

This invention relates to a method for manufacturing an optical element provided with a desired pattern or patterns having both photochromic and fluorescence-quenching properties by penetration of ions having such properties on a fluorescent glass containing an ion-exchangeable ions.

The optical elements which have heretofore been used most widely in optical machinery and appliances, etc., are those glass bodies, on the inner or outer surface of which are formed various types of patterns such as graduations, crossing lines, lattices, characters, symbols, and so forth.

These patterns which are formed on such optical elements by ordinary mechanical, physical, or chemical expedients are always ostensible on the surface of the element. However, depending on the types of the optical machinery and appliances or the manner of using such optical element, it is often desirable that the pattern appear on the element only under specific circumstances and that it is extinguished or quenched under other circumstances so as not to hamper the viewing sight.

2. Description of the Prior Art

With a view to attaining a controlled pattern indication in the optical machinery and appliances, there has heretofore been developed an optical element, in which the photochromic and fluorescence-quenching properties of a substance are utilized for such pattern.

The photochromism is a property of a photochromic substance which exhibits reversible discoloration such that when the substance, either in solid or in liquid state, is subjected to exciting irradiation, e.g., ultraviolet rays in an ordinary case, it discolors due to its absorption of a specific visible light, and, in a certain definite time period after cessation of the irradiation, the color returns to its original color tone before the irradiation.

The fluorescence, on the other hand, is a property given by existence of a fluorescent substance which emits a visible light, or radiant rays having a longer wavelength than that of the exciting radiant rays, usually ultraviolet rays, when it is subjected to irradiation by such exciting radiant rays, but does not emit the radiant rays, when it is not irradiated by the exciting radiant rays.

When the optical element using the substance having the above-mentioned properties is adapted in optical machinery and appliances, it becomes possible to select, by irradiation of the exciting radiant rays, a case in which the pattern is required to merge on the optical element, or it hampers the viewing sight, and a case in which it is visible.

Such optical element can be readily produced by adhering a transparent photochromic pigment, or a transparent fluorescent pigment onto the surface of a glass object in a desired pattern. However, since the pattern thus formed is exposed on the outer surface of the glass body, the resultant optical element is liable to various defects. For example, the element may be easily scratched, peeled off the glass surface, or embody other mechanical weaknesses, and it tends to deteriorate its physical property due to chemical instability.

In order to remove such defects, it is contemplated that the pattern of the optical element be covered by a transparent sheet of glass to protect its surface both chemically and mechanically. However, the covering of the optical element with the transparent glass sheet causes absorption of the exciting radiant rays by the glass sheet with the result that insufficient exhibition of the physical properties of the photochromism and the fluorescence can be expected, and that the pattern to appear on the optical element is less precise, thus making it difficult to adopt the element for the optical precision machinery and appliances.

Further, since the pattern having the photochromism emits no radiant rays by itself, but rather appears by itself on the basis of visible light absorption, it can be recognized only under the irradiation of a visible light.

On the other hand, the pattern having the fluorescence itself emits light upon irradiation of exciting radiant rays and only during the irradiation, so that it can be characteristically recognized even in ambient darkness by the visible light which the pattern emits, when an invisible light such as ultraviolet rays, etc., are used as the exciting radiant rays, whereby the recognition of the fluorescent pattern becomes clearer than that is ambient brightness. When the irradiation of the exciting radiant rays is stopped, the fluorescent emission from the pattern can no longer be recognized.

SUMMARY OF THE INVENTION

Accordingly, we contribute, by the present invention, an optical element for use in optical machinery and appliances and which is free from the above-described defects and difficulties present in known optical elements of the class described.

We also contribute a method of manufacturing such optical element which is free from the aforementioned mechanical and chemical weaknesses in respect of the pattern drawn on the glass body.

The optical element according to the present invention is manufactured in such a manner that ions of substances to impart the photochromic and fluorescence-quenching properties are penetrated into the inner surface of a fluorescent glass from its outside conformity with the shape of desired patterns so as to possess such photochromic and fluorescence-quenching properties in the form of a positive picture. The latter condition is such that it extinguishes fluorescence in the fluorescent glass interior, and then the glass body containing therein the penetrated ions of the photochromic and fluorescence-quenching properties is subjected to an appropriate secondary heat-treatment to form at the penetrated portion of the ions in the inner surface of the glass body the desired patterns having both properties of photochromism and fluorescence-quenching.

The thus manufactured optical element is perfectly free from the afore-described various defects and difficulties, and possesses increased mechanical and chemical resistance to effects of external origin, thereby making it possible to obtain a pattern of very precise and fine indications. At the same time, it becomes possible to present the pattern on the optical element irrespective of the degree of ambient brightness owing to the combined use of both photochromic and fluorescence-quenching properties in one and the same pattern, and it also becomes possible to contain a plurality of concealed signs and symbols in the optical element depending on its purpose of use.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein:

FIGS. 1(a) and 1(b) are respectively a plan view and a cross-sectional view of a glass body, on one surface of which metal film layers are deposited;

FIGS. 2(a) and 2(b) are respectively a plan view and a cross-sectional view of a glass body having in one inner surface thereof a concealed pattern of the photochromic and fluorescence-quenching property and another concealed pattern of the fluorescence-quenching property;

FIGS. 3(a) and 3(b) are respectively a plan view and a cross-sectional view of a glass body which show the fluorescence-quenching pattern;

FIGS. 4(a) and 4(b) are respectively a plan view and a cross-sectional view of a glass body which reveal the photochromic pattern;

FIG. 5 is a plan view of one example of the optical element according to the present invention used as a means to denote an operational symbol; and FIG. 6 is another example of use of the optical element according to the present invention as a scale for measurement.

DESCRIPTION OF THE PREFERRED EMBODIMENTS

By the term "fluorescence-quenching pattern" as used in the present application, we mean a pattern which is formed in one inner surface of a fluorescent glass at a portion where the fluorescence thereof is most hindered by the ions having the fluorescence-quenching property, i.e., a pattern formed in one portion of the fluorescent glass having a weak or the least fluorescent capability.

The fluorescent glass generally contains ions which play a fluorescence center in it.

These ions having incomplete $f$- electron shells such as europium (III) ion $Eu^{3+}$, terbium (III) ion $Tb^{3+}$, urany ion $UO_2^{2+}$, etc.; incomplete $d$- electron shell such as manganese (II) ion $Bi^{3+}$, antimony (III) ion $Sb^{3+}$, lead (II) ion $Pb^{2+}$, tin (II) ion $Sn^{2+}$, insium (I) ion $In^+$, gallium (I) ion $Ga^+$, etc.; and complete $d$- electron shell such as copper (I) ion $Cu^+$, silver (I) ion $Ag^+$, gold (I) ion $Au^2$, etc.

The base glass to impart the photochromic property should contain, as its components, copper (I) ion $Cu^+$ and one of the halogens such as, for example, chlorine. Also, for the photochromic property to be imparted to a desired pattern alone, it is desirable that silver be not contained, although no actual inconvenience or trouble may take place if its content is in such a minor range that it does not affect the pattern recognition.

It is further desirable that alkali ions be present in the base glass in order to facilitate the ion-exchange. Sodium ions are considered appropriate from the standpoint of glass manufacturing and ion penetration. However, alkali ions such as potassium, lithium, etc., may also be useful.

Although silver halide is not limited to act mainly for the purpose of photochromism, it is usual that the silver ions are preferentially used as the ions to impart the photochromic property, if the base glass usually contains the halogen. Further, the silver ions act not only to impart the photochromic property, but also to impart the fluorescence-quenching property to the glass body. While the silver ions per se may essentially play a role of fluorescent emission, they may also act principally to quench the fluorescence in some fluorescent glass.

When silver ions are contained in the glass body at a high concentration, it brings about fluorescence-quenching with the result that it functions essentially only as the quenching ion.

Copper (I) and tallium (I) ions are also considered as appropriate fluorescence-quenching ions in respect of their fluorescence-quenching and penetrating capabilities. Since these ions do not usually exhibit photochromism properties, they are particularly useful when a fluorescence-quenching pattern having no photochromic property is to be made coexistent with a pattern having both photochromic and fluorescence-quenching properties.

The glass body to be used for the optical element is usually in the shape of a plate, wedge, prism, or lens, although there is no particular limitation to the shape in applying the present invention.

It is preferable that the surface of the glass body for ion-penetration be preliminarily polished by an ordinary mechanical, thermal or chemical method to attain flatness and smoothness. Also, when high precision is particularly required of the intended pattern, the glass surface should be made smooth.

The pattern having both functions of the required photochromism and fluorescence-quenching is formed on the fluorescent glass by adhering a compound containing the ion to be penetrated, or a metal to form such ion onto the surface of the fluorescent glass body in the form of a film layer by means of printing, masking, photo-fabrication, etc., in conformity to the shape of a pattern which is in the form of a positive picture with the intended pattern, than causing the ion to be penetrated into the glass surface by an appropriate method, and finally subjecting the glass body to an appropriate heat-treatment.

The pattern may also be formed by placing onto the surface of the glass a body mask which hinders penetration of ions into the glass surface except for the portion corresponding to the intended pattern formation, then causing the ions to be penetrated into the glass surface at this portion of the pattern formation, and finally subjecting the glass object to an appropriate heat-treatment.

Ion-penetration can be carried out by various ion-exchanging methods such as gas-phase oxidation of a metal film, oxidation of a metal film under application of an electric field, compound pasting method, and so on.

In order to enable those skilled in the art readily to put this invention as explained in the foregoing into practice, the following preferred embodiments are presented. It should, however, be noted that they are not intended to limit the scope of the present invention, but any combination and modification in its practice may be made within the ambit of the present invention as recited in the appended claims.

EXAMPLE I

On one surface of a fluorescent glass body containing sodium oxide, and small quantities of copper oxide and a halogen, there is deposited a film layer of silver at a patterning portion which is in the form of a positive picture with a desired pattern having photochromic and fluorescence-quenching properties, and then there is further formed a film layer of copper at a patterning portion which is in the form of a positive picture with a desired pattern having the fluorescene-quenching property alone. After the film deposition, the combination of the glass body and the metal film layers is heated in an oxidizing atmosphere, whereupon both silver and copper are ionized, and penetrated into the base glass surface. Subsequently, when the glass body, into which the silver and copper ions have been penetrated, is further heated, depending on necessity, there is obtained an optical element having therein desired concealed patterns, the one having the photochromic and fluorescene-quenching property alone.

The fluorescent glass used in this example is composed of 60.0 percent by weight of silicon dioxide ($SiO_2$), 18.0 percent by weight of boron oxide ($B_2O_3$), 9.5 percent by weight of aluminum oxide ($Al_2O_3$), 10.7 percent by weight of sodium oxide ($Na_2O$), 1.4 percent by weight of fluorine, 0.3 percent by weight of chlorine, 0.1 percent by weight of iodine, and 0.015 percent by weight of cuprous oxide ($Cu_2O$).

For the silver and copper ions to be produced from the respective adhered film layers of silver and copper, and to be penetrated into the base glass, it is desirable that the base glass contain an element producing a monovalent ion such as sodium, potassium, etc., which is readily ion-exchangeable with the silver and copper ions.

When the glass contains a small amount of cuprous oxide, it essentially functions to impart the fluorescent property to the glass, and when the silver ion is penetrated thereinto, glass possesses the photochromic property.

Since the halogens are properly combined with the silver ion penetrated into the glass body and the copper ion primarily contained therein, their presence in the glass body is indispensable for it to have the photochromic property. Of the halogens, chlorine ion exhibits very remarkable effects.

The pattern on the base glass is formed in such a manner that one surface of the glass body is covered with a masking plate leaving the patterning portion open, and then silver and copper are evaporated on the glass surface in a vacuum condition, or that the silver and copper film layers are formed over the entire glass surface, and subsequently the unnecessary portions of these film layers are eliminated by the resist method, leaving thereon the required pattern only. Appropriate thickness of the film layer is usually 200nm or so.

As shown in FIG.1(a) and 1(b), the silver film layer 2 is formed on the fluorescent glass body 1 for the pattern having the photochromic and fluorescence-quenching properties, and the copper film layer 3 for the pattern having the fluorescence-quenching property alone.

The ionization of silver and copper and the penetration of the silver and copper ions into the base glass are carried out by a heat-treatment in an oxidizing atmosphere consisting, for example, of air and 0.5 to 5 percent by weight of sulphur trioxide at a temperature of from 250° to 400°C for a time period of from 15 to 90 minutes. By this heat-treatment under the above-exemplified treating conditions, both silver and copper are activated by oxidation to be ionized and penetrated into the fluorescent glass base 1 as the silver and copper ions.

The ion-exchanged patterns 4 and 5 resulted from the ion-penetration as shown in FIGS. 2(a) and 2(b) are in the same shapes as those of the adhered film layers 2, 3 in FIGS. 1(a) and 1(b). These ion-exchanged patterns, however, are concealed in the glass surface under an ordinary condition, and are difficult to be recognized unless they become ostensible by an external cause such as irradiation of exciting radiant rays.

The concealed patterns 4 and 5 in FIGS. 2(a) and 2(b) indicate, respectively, the concealed pattern having the photochromic and fluorescence-quenching properties, and the concealed pattern having the fluorescence-quenching property alone.

The conditions for the penetration treatment of the ions are determined by the glass composition, shape of the glass body, and the kind and quantity of the ions to be penetrated. If the treatment conditions are inadequate, the ion-penetration cannot be done satisfactorily, but there are brought about various troubles such that the shape of the glass object is impaired to disturb the pattern, and the penetrated ions are reduced and agglomerated into a colored, colloidal form with the result that no function of the concealed pattern can be derived.

If no photochromism and fluorescence-quenching as desired are obtainable from the above-described ion-exchanging treatment, further heat-treatment is required to improve such properties. According to this example, the optical element containing the concealed patterns having the desired photochromic and fluorescence-quenching properties can be obtained by a primary heat-treatment at 440°C for 30 hours followed by a secondary heat-treatment at 530°C for 10 hours. In particular, the photochromism remarkably improves by this secondary heat-treatment.

The thus formed concealed patterns do not appear under irradiation of ordinary white light or visible light, hence they cannot be recognized. Therefore, when the patterns are required to emerge, ultraviolet rays as the exciting radiant rays may be irradiated onto the optical element from the side of the ion-penetrated surface. Since the ultraviolet rays are easily absorbed by the silver and copper ions, and in particular, cause the quenching of light when the ions of silver and copper especially are penetrated into the glass base at a high concentration, the portions in the glass base where these silver and copper ions are penetrated are extremely weak in the emission of the fluorescent light in comparison with the remaining portions where these ions are not penetrated and, in reality, there is no light emission. Thus, the fluorescence-quenching pattern appears on the optical element by the irradiation of the exciting radiant rays onto the surface of the optical element.

The patterns 4' and 5' in FIGS. 3(a) and 3(b) are those which correspond to the film layers 2 and 3 adhered onto the base glass and have appeared on the optical element as the result of irradiation by the exciting radiant rays. Since these patterns correspond to the light emission of the optical element per se at the patterned portions on the base glass which is in the form of a negative picture with respect to the formed pattern, they become very clear placed in the dark. Also, by the irradiation of the exciting radiant rays, the portion of the pattern where the silver ion alone is penetrated assumes properties of photochromism with the result that, when a white light is irradiated onto the ion-penetrated surface of the optical element, it selectively absorbs a visible light of a particular wavelength. This selective absorption persists over a certain period of time after cessation of irradiation by the exciting radiant rays.

In FIGS. 4(a) and 4(b) showing the pattern 4" which has appeared owing to its photochromism, the color tone of the pattern due to the photochromism is generally brownish, and, in this example, it is greyish brown.

EXAMPLE II

On one surface of the base glass of the same composition as used in the preceding Example I, there is adhered a film layer of silver of approximately 200nm in thickness at the patterning portions which are in the form of a positive picture with respect to a desired pattern having the photochromic and fluorescence-quenching properties and another pattern having a fluorescence-quenching property alone, thereafter a film layer of copper is further adhered onto the film layer of silver adhered onto the patterning portion which is in the form of a positive picture with respect to the pattern having the abovementioned fluorescence-quenching property alone. After deposition of the film layer on the base glass, the combination is first heated in an electric field, and then further heated without the electric field, whereby the desired concealed patterns are formed in the optical element.

The heat-treatment under the electric field is actually carried out in such a way that, after the film layers of silver and copper are deposited on the glass plate of 1.2mm thick, electrodes are attached onto both surfaces of the glass plate with the surface of the deposited film layers of silver and copper a positive side, and with the opposite surface thereof a negative side, after which an electric power of 50 volts is impressed on the electrodes. In this state of the field impression, when the heat-treatment is conducted at a temperature of 280°C for 30 minutes, both silver and copper are oxidized in their ionized state and the ions are penetrated into the glass body to a depth of approximately 20nm.

After the above primary heat-treatment, when the combination of the glass plate and the deposited silver and copper film layers is subjected to secondary heat-treatments at 440°C for 30 hours and at 530°C for 10 hours, respectively, there can be produced the optical element containing therein a concealed pattern having the desired photochromic and fluorescence-quenching properties, and another concealed pattern having the fluorescence-quenching property alone.

The heat-treatment under electric field application is more suitable than the heat-treatment in an oxidizing atmosphere for a very fine pattern to be obtained. If the first-mentioned method is combined with the resist method, it is possible to manufacture the optical element containing an extremely fine pattern having a line width as wide as 3 microns.

As described in the foregoing, according to the method of the present invention, a concealed pattern having both photochromic and fluorescence-quenching properties can be formed by penetrating into a fluorescent glass an appropriate composition of metal ions capable of imparting thereto photochromic and fluorescence-quenching properties, and the concealed pattern can be shown up by irradiation of exciting radiative rays without regard to ambient brightness.

Further, as it is possible that a photochromic pattern and a fluorescence-quenching pattern of mutually similar or different types can be made coexistent in one and the same glass body in a concealed state, no concealed pattern shows up where there is no irradiation of the exciting radiant rays, hence no necessity of reducing the amount of light, or no apprehension of hampering the viewing sight, and the pattern smits light when the exciting radiant rays are irradiated onto it, and, even after cessation of the irradiation, it persistently absorbs a visible light for a certain definite time period, whereby the pattern remains on the optical element.

According to the present invention of the afore-described construction, various advantageous characteristics can be enjoyed such as the formation of photochromic and fluorescence-quenching patterns of extremely fine and precise shape, and the optical element manufactured by the present method has large mechanical and chemical durabilities on account of the patterns being formed in the interior of the glass body, and of the ion penetration having the effect of increasing the chemical strength.

Lastly, explanations will be made as to actual application of the optical element of the afore-described nature in the field of "operational symbol indication" and "measuring scale having a plurality of graduations."

Referring to FIG. 5 which shows one example of the operational symbol indicating panel made of the optical element of the present invention, in which the indicator is to show symbols "+" and "−", the optical element comprises a fluorescent glass 1, a pattern 2 having the photochromic and fluorescence-quenching properties, and another pattern 3 having the fluorescence-quenching property alone.

Both these patterns 2 and 3 are formed within the inner surface of the base glass 1 in the shape indicated, onto which the ultraviolet rays are kept constantly irradiated. In this state, when visible light passes through the glass 1 from outside, the element indicates the symbol "−", since the patterned portion 2 indicates the photochromic property. When there is no irradiation of visible light, the patterned portions 2 and 3 come to possess the fluorescence-quenching property, whereby the element indicates the symbol "+". It is of course possible that many operational symbols may be indicated on the optical element by the manner of irradiating the visible light and ultraviolet rays.

In FIG. 6 which indicates an example of measuring scale having a plurality of graduations, the graduations 2 are those patterns that have the photochromic and fluorescene-quenching properties, while the graduations 3 and those patterns that have the fluorescence-quenching property alone, both being formed in the interior of the fluorescent glass body 1.

As stated in the preceding, when ultraviolet rays are constantly irradiated onto the optical pattern, the entire graduations can be made recognizable, since the graduations 2 and 3 are of fluorescence-quenching nature in ambient darkness, while the graduations 2 alone appear, as they are of photochromic nature in ambient brightness, hence the scale has wide varieties of use in a measuring instrument, etc.

We believe that the construction and operation of our novel optical element, as well as its method of manufacture, will now be understood, and that the several advantages thereof will be fully appreciated by those persons skilled in the art.

We claim:

1. An optical element containing therein a pattern having photochromic and fluorescence-quenching properties and another pattern having the fluorescence-quenching property alone, which comprises in combination:
    a. a fluorescent glass body containing therein an ion-exchangeable ion;
    b. a first metal ion capable of inducing both photochromism and fluorescence-quenching; and
    c. a second metal ion other than said first metal ion capable of inducing the fluorescence-quenching alone,
    said ion-exchangeable ion in said glass body being ion-exchanged with said first and second metal ions to enable said metal ions to be penetrated into said glass body and to form the required patterns in the inner surface of said glass body.

2. The optical element according to claim 1 which is further heat-treated.

3. The optical element as defined in claim 1, wherein said first metal ion is selected from the group consisting of silver ion, a mixture of silver and gold ions, a mixture of silver and tallium ions, and a mixture of silver and copper ions.

4. The optical element as defined in claim 1, wherein said second metal ion is at least one selected from the group consisting of ions having incomplete $f$- electron shell, ions having incomplete $d$- electron shell, ions having complete $s^2$- electron shell, and ions having complete $d^{10}$- electron shell.

5. The optical element as defined in claim 3, wherein said second metal ion is copper ion or tallium ion.

6. A method for manufacturing an optical element containing therein a pattern having photochromic and fluorescence-quenching properties and another pattern having the fluorescence-quenching property alone, which comprises steps of:
    a. forming film layers of a first metal having the photochromic and fluorescence-quenching properties and a second metal having the fluorescence-quenching property in a desired pattern on one surface part of a fluorescent glass body containing therein an ion-exchangeable ion;
    b. causing said film layers of the first and second metals to ionize; and
    c. ion-exchanging said ionized layers of said first and second metals contacted on said glass surface with said ion-exchangeable ion contained in said glass body to enable said first and second metal ions to penetrate into said glass body.

7. The method as defined in claim 6, wherein the combination of the glass body and the film layers of said metals is further heated to increase the photochromic property in said first metal ion penetrated into said glass body.

8. The method as defined in claim 6, wherein said glass is selected from glasses containing sodium ion, lithium ion, and potassium ion.

9. The method as defined in claim 6, wherein said first metal is selected from the group consisting of silver, a mixture of silver and gold, and a mixture of silver and tallium.

10. The method as defined in claim 6, wherein said second metal ion is selected from the group consisting of ions having incomplete $f$- electron shell, ions having incomplete $d$- electron shell, ions having complete $s^2$- electron shell, and ions having complete $d^{10}$- electron shell.

11. The method as defined in claim 9, wherein said second metal ion is copper ion or tallium ion.

12. A method for manufacturing an optical element containing therein a pattern having photochromic and fluorescene-quenching properties, and another pattern having the fluorescence-quenching property alone, which comprises steps of:
    a. forming on one surface part of a fluorescent glass body containing therein ion-exchangeable ions a first film layer of silver capable of inducing the fluorescence-quenching property in a desired pattern;
    b. ion-exchanging said first silver layer with said ion-exchangeable ions in said glass body and causing said first silver layer ions to penetrate into said glass body;
    c. subjecting the combination to a heat-treatment to increase the photochromic property in said first silver ions;
    d. forming a second film layer of silver having the fluorescence-quenching property alone on said glass body in a desired pattern; and
    e. ionizing said second silver layer, and ion-exchanging said second silver layer ions with said ion-exchangeable ions in said body to enable said second silver layer ions to penetrate glass body said glass body.

* * * * *